(Model.) 3 Sheets—Sheet 1.

J. W. THOMAS & J. D. OTSTOT
FERTILIZER DISTRIBUTER.

No. 279,044. Patented June 5, 1883.

WITNESSES
F. L. Durand
Rev. Smith

INVENTORS
Joseph W. Thomas
John D. Otstot
by A. M. Smith
Attorney.

(Model.) 3 Sheets—Sheet 2.

J. W. THOMAS & J. D. OTSTOT.
FERTILIZER DISTRIBUTER.

No. 279,044. Patented June 5, 1883.

WITNESSES
F. L. Ouraud
Rex Smith

INVENTORS
Joseph W. Thomas
John D. Otstot
by A. M. Smith
Attorney.

(Model.)

3 Sheets—Sheet 3.

J. W. THOMAS & J. D. OTSTOT.
FERTILIZER DISTRIBUTER.

No. 279,044.

Patented June 5, 1883.

WITNESSES
F. L. Ourand.
Rex Smith

INVENTORS.
Joseph W. Thomas,
John D. Otstot,
by A. M. Smith
Attorney.

N. PETERS, Photo-Lithographer, Washington, D. C.

UNITED STATES PATENT OFFICE.

JOSEPH W. THOMAS AND JOHN D. OTSTOT, OF SPRINGFIELD, OHIO, ASSIGNORS TO THOMAS, LUDLOW & RODGERS, OF SAME PLACE.

FERTILIZER-DISTRIBUTER.

SPECIFICATION forming part of Letters Patent No. 279,044, dated June 5, 1883.

Application filed February 2, 1883. (Model.)

*To all whom it may concern:*

Be it known that we, JOS. W. THOMAS and JOHN D. OTSTOT, of Springfield, county of Clarke, and State of Ohio, have invented a new and useful Improvement in Fertilizer-Distributers, of which the following is a full, clear, and exact description, reference being had to the accompanying drawings, making part of this specification.

Our invention relates to that class of distributers employing a horizontally-rotating disk or hopper-bottom having a central outlet or discharge-opening and means for gradually conveying the material operated upon inward in a steady stream to said central discharge-outlet; and it consists in the combination, with a horizontally-rotating disk or annulus having a central discharge-opening and means for crowding the material operated upon inward toward said opening, of a pivoted and horizontally-swinging adjustable gage or gate for regulating the flow of the material inward to said opening; in locating said gage underneath a stationary shell, dome, or plate covering said central opening; in arranging the adjustable gage or gate for regulating the quantity of material passing under the stationary shell or plate to the central outlet with its swinging or gaging end facing the moving material; in providing the rotating disk or annulus with a removable facing plate or ring, and in certain details of construction and arrangement of parts, as hereinafter explained.

Figure 1:
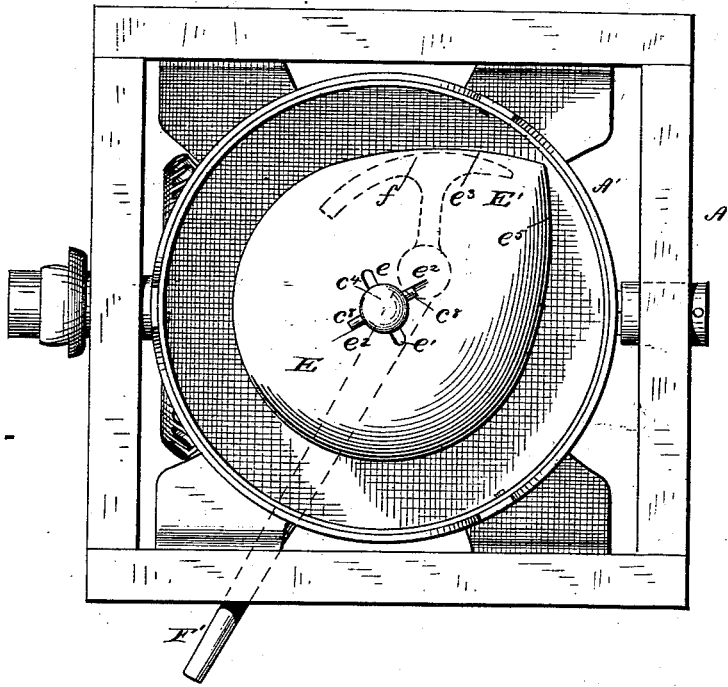
Figure 2:
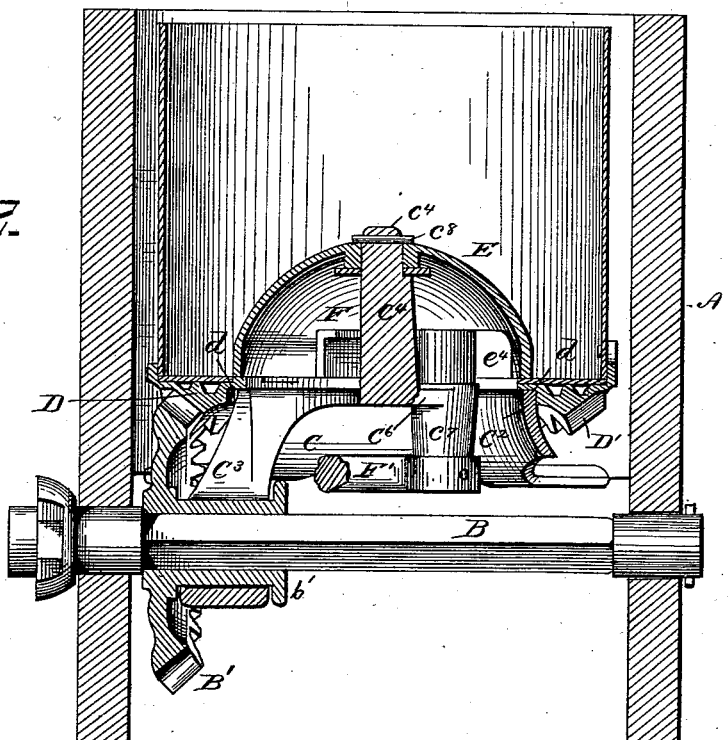
Figure 3:
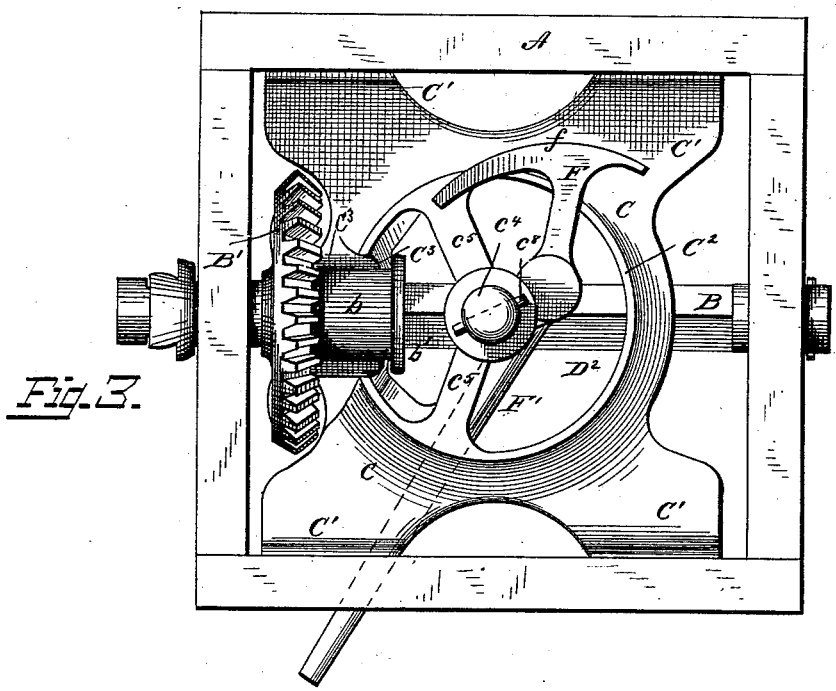
Figure 6:
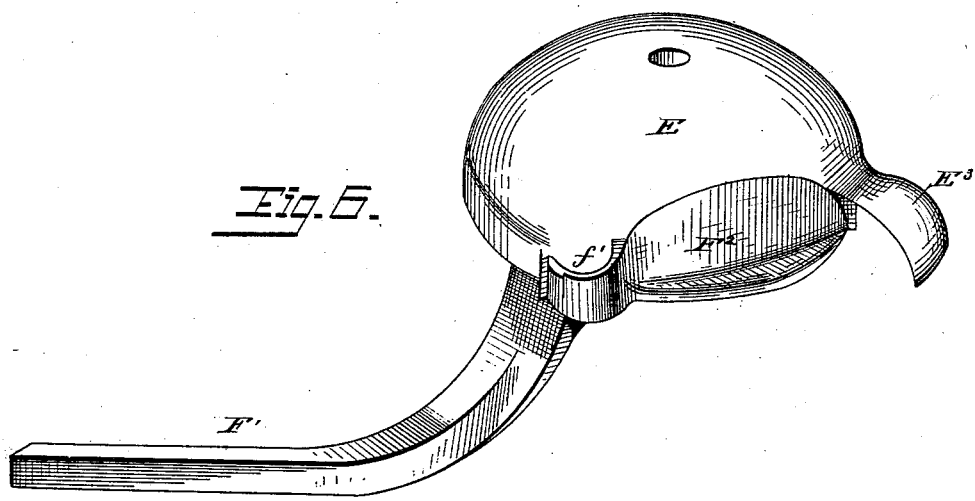
Figure 4:
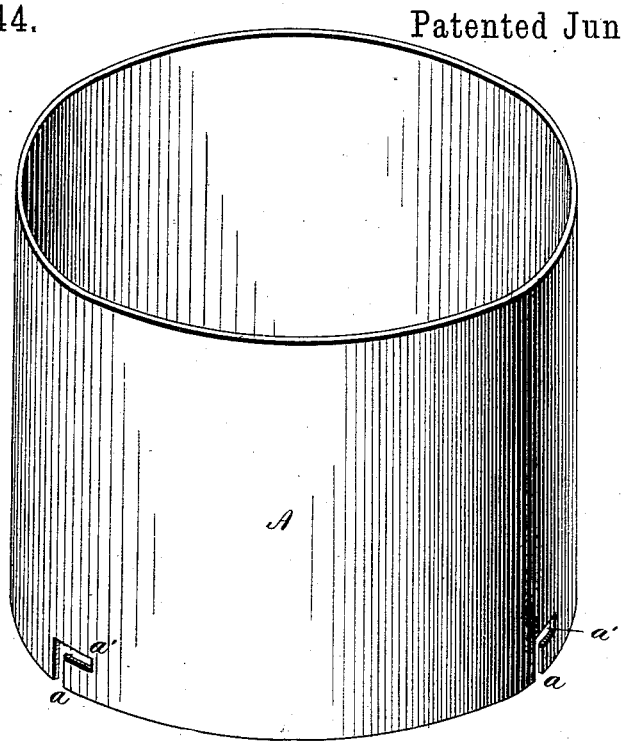
Figure 5:
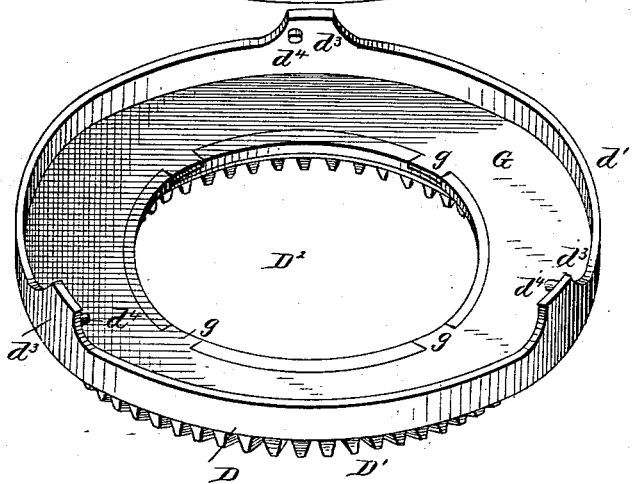

In the accompanying drawings, Figure 1 represents a plan or top view of a single hopper with our improvements applied. Fig. 2 is a vertical section taken in line with the transverse driving-shaft. Fig. 3 is a plan view with the stationary dome or shell removed. Figs. 4 and 5 represent in perspective the rotating hopper and hopper-bottom detached for showing the bayonet-joint through which they are connected; and Fig. 6 is a perspective view, showing a modification in the form of the stationary dome or shell and of the adjustable gage or gate.

Our invention is intended, mainly, for use in connection with a grain-drill or seeding-machine employing fertilizer-compartments corresponding in number to the number of seed-tubes or distributers employed, either in the form of separate hoppers or, preferably, in the form of a long transverse box or hopper provided with a series of horizontally-rotating hoppers, or divided into as many compartments as desired, and each provided with a rotating bottom, all geared to and operated from a single transverse shaft. For the proper understanding of our improvements, however, it will only be necessary to describe one of the compartments or hoppers.

A represents the hopper box or frame, provided in its side or end standards with suitable bearings for a transverse shaft, B, arranged underneath the hopper, and from which motion is imparted through bevel gear or gears B' to the rotating hopper bottom or bottoms, as will be explained. Underneath each hopper or compartment is secured a bracket or support, C, the form of which is shown in the plan view, Fig. 3, taken in connection with the sectional view, Fig. 2, said bracket being provided with arms or feet C', through which it is attached to the bottom of the front and rear hopper-frame bars, said arms extending from a central upright sleeve or ring, $C^2$, which forms an annular bearing for the rotating disk or annulus forming the hopper-bottom D outside of and surrounding the central discharge-opening in said bottom. This annular sleeve-bearing is open on one side to admit a journal-sleeve, $b$, formed on the wheel B', mounted upon and rotating with the shaft B, and has a pendent loop, $C^3$, formed upon it, extending underneath said opening, in which loop the journal-sleeve $b$ has its bearing. The sleeve $b$ terminates at one end in the hub of wheel B', and at the other end is provided with a collar, $b'$, which, in connection with the hub, serves to prevent end-play of the sleeve $b$ in said bearing and to hold the gear B' in proper working relation to the toothed bevel-rim D' on the disk or annulus D.

The bracket or bearing-plate C is provided with a central upright hub or standard, $c^4$, connected by radial arms $c^5$ with the bearing-sleeve $C^2$, and forming a support for the central dome or shell, E, hereinafter described, and said hub has on one side a short radial arm, $c^6$, the outer end of which is provided with a short vertical sleeve, $c^7$, in which the pivot of the horizontally-swinging gage F is mounted. By the construction described the bracket or support is provided with an annular bearing, $c^2$, for the rotating hopper-bottom, a pendent loop-bearing for the sleeve of the bevel-gear actuating said bottom, a central upright for the support of the dome or shell covering the central discharge-outlet in said rotating bottom, and a support within said central opening for the vertical pivot of the gage or gate regulating the discharge of the contents of the hopper, as will be described.

The hopper-bottom D is by preference made in the annular form shown in Fig. 5, provided on its lower face, at its outer edge, with a bevel-toothed rim or ring, D', through which it is connected with and driven from the bevel-wheel B, and inside of said toothed rim with an annular rabbet, $d$, surrounding the central opening, $D^2$, within which the annular bearing-sleeve $C^2$ of the bracket C rests. The disk or ring D is by preference recessed, or provided with an annular concavity on its upper face, for the purpose of making it light and avoiding unnecessary waste of metal, and is provided with a light facing-plate or ring G, extending from an upright annular flange, $d'$, on the outer edge of the ring or disk D to an inner flange surrounding the central opening, $D^2$, and having notches with which spurs $g$ on the ring G engage for preventing relative movement of the ring and facing-plate. The flange $d'$ has upright ears $d^3$ formed upon it, provided with inwardly-projecting pins $d^4$, which enter vertical slots $a$, terminating at their upper ends in horizontal slots $a'$ in the lower end of the cylindrical hopper A', forming a bayonet-joint connection between the rotating hopper-bottom and the rotating cylindrical hopper A' when the latter is used. This construction of the joint adapts the hopper to be readily removed for affording access to the facing-plate G for cleaning or removing and replacing the latter and other purposes.

The shell or plate E, covering the central opening, $D^2$, in the hopper bottom, is by preference made dome-shaped, as shown, with an eccentric formation or lip, E', upon one side, which projects into close proximity with the side wall of the hopper A', and serves to intercept the material operated upon. This shell or dome has a central perforation fitting the upper end of the stationary upright stud $c^4$, with slots $e$ $e'$ radiating from said central perforation, adapting pins $c^5$ on said stud to pass through the shell. The upper face of the shell around the central perforation has inclines formed upon it, terminating in upright radial shoulders $e^2$, arranged about at right angles to the slots $e$ and $e'$, and against which the pins $c^5$ rest after the shell has been placed on the stud $c^4$ and turned into working position, in which it is held by said pins and shoulders. The lip E' on the side $e^3$ facing the moving material in the hopper has an opening, $e^4$, formed in its vertical wall, through which the material passes under the lip, and the rear wall, $e^5$, of the lip E', converging inward toward the central opening, $D^2$, serves to scrape said material inward to and to discharge it through said opening. The opening $e^4$ in the forward side of the lip E' is provided with a swinging gate, F, connected by a vertical pivot with the sleeve $c^7$, within the central opening through the bracket C, said gate or gage being set facing the opening $e^4$ in the lip E', and the moving material in the hopper and opposing the direction of such movement. The curved vertical face $f$ of this gate is elongated sufficiently in the arc of a horizontal circle to adapt it to entirely close the opening $e^4$ in the lip, when desired, while by swinging or adjusting said gate inward said opening may be opened more or less for regulating the amount of material passing through the same to the central discharge-outlet. A lever, F', is connected with the lower end of the vertical gate-pivot for adjusting said gate or gage, and where a series of the distributing disks or rings are employed, arranged side by side, the levers of the several adjusting gates or gages may all be connected with a single transversely-moving bar, adapting all the gages to be simultaneously and uniformly adjusted.

In Fig. 6 a modification in the form of the shell or dome and its projecting lip and in the manner of pivoting the gate is shown. The shell more nearly approximates a hollow hemisphere with an arching lip (indicated by $E^3$) formed upon one side and open both in front and in rear, so that the material on the moving bottom of the hopper can pass directly underneath the lip without being crowded inward to the central discharge-outlet. In this construction the gage or gate (indicated by $F^2$) is pivoted to the shell, at $f'$, in rear of the lip, relatively to the path of the moving material, and the handle or lever F' is curved downward, so as to pass through the hopper-bottom and its support. The gate or gage in this construction resembles more nearly a shear-blade expanded in thickness or vertical height, with its point adapted to be thrown out more or less under the lip $E^3$ for causing it to seize upon and draw into the central discharge-opening more or less of the moving material which it faces, the blade itself serving to scrape said material inward for causing its discharge.

Other modifications may be made in the form of the parts, but the construction and arrangement first described has been found to work well in practice and is the preferred one.

The means for conducting the fertilizer to the seed-tubes or to the ground after it passes through the central discharge-opening, $D^2$, may be similar to such as are now in use, as may also the gearing for driving the distributer-wheel operating-shaft B, and such parts need not therefore be described.

Having now described our invention, what we claim as new is—

1. The annular horizontally-rotating hopper-bottom, having a central discharge-opening, in combination with a stationary gate or gage arranged above said bottom and made adjustable on a vertical pivot for regulating the discharge of the material operated upon, substantially as described.

2. The annular horizontally-rotating hopper-bottom, having the central discharge-opening, in combination with a stationary plate or shell arranged above and covering said opening, and provided with an opening in its side, and a stationary vertically-pivoted gate for regulating the discharge of the material operated upon through said openings in the ring and shell, substantially as described.

3. The combination of the annular horizontally-rotating hopper-bottom, provided with the central discharge-opening, the notched stationary plate or shell covering said opening, and the stationary vertically-pivoted gate or gage for regulating the discharge of the material operated upon, arranged underneath said shell with its gaging end opposing the direction of movement of the disk or ring and of the material thereon, substantially as described.

4. The annular horizontally-rotating hopper-bottom, having the central discharge-opening, and provided with an annular bearing surrounding said opening, and the bevel-toothed rim surrounding said annular bearing, and through which said disk or ring is actuated, in combination with the rotating hopper, detachably connected with said rotating bottom, substantially as described.

5. The horizontally-rotating annular hopper bottom, having a central discharge-opening, in combination with the removable annular facing-plate, substantially as described.

6. The horizontally-rotating disk or ring, having a central discharge-opening, in combination with a supporting-bracket provided with an annular bearing for said disk or ring, a central bearing for the vertical pivot of the adjustable gate or gage, and a bearing for the horizontal shaft of the bevel-wheel actuating said disk or ring, substantially as described.

7. The bracket supporting the rotating hopper-bottom, provided with an annular bearing for said bottom, a fixed central upright for supporting the stationary shell above said bottom, a sleeve-bearing for the vertical pivot of the adjustable feed gate or gage, and a bearing for the horizontal shaft of the bevel-wheel actuating said rotating bottom, all substantially as described.

8. The rotating hopper-bottom, provided with the upright peripheral flange or rim, in combination with the inwardly-projecting spurs formed on said flange, and the removable annular hopper, applied and operating substantially as described.

In testimony whereof we have hereunto set our hands this 31st day of January, A. D. 1883.

JOSEPH W. THOMAS.
JOHN D. OTSTOT.

Witnesses:
   ROBT. C. RODGERS,
   ADDISON S. RODGERS.